United States Patent [19]

Todd

[11] 4,085,537
[45] Apr. 25, 1978

[54] FISHING LURE RETRIEVER

[76] Inventor: Harry V. Todd, 2429 Windmill View, El Cajon, Calif. 92020

[21] Appl. No.: 741,796

[22] Filed: Nov. 15, 1976

Related U.S. Application Data

[63] Continuation-in-part of Ser. No. 686,584, May 14, 1976, abandoned, which is a continuation-in-part of Ser. No. 643,548, Dec. 22, 1975, abandoned.

[51] Int. Cl.² .......................................... A01K 97/00
[52] U.S. Cl. ................................................... 43/17.2
[58] Field of Search ..................................... 43/17.2, 5

[56] References Cited

U.S. PATENT DOCUMENTS

| | | | |
|---|---|---|---|
| 2,210,271 | 8/1940 | Thwaits | 43/5 |
| 2,235,371 | 3/1941 | Jyrkas | 43/5 |
| 2,488,996 | 11/1949 | Thompson | 43/17.2 |
| 2,586,073 | 2/1952 | McKee | 43/17.2 |
| 3,163,955 | 1/1965 | Lockwood | 43/17.2 |
| 3,191,335 | 6/1965 | Sobetzer | 43/17.2 |
| 3,296,730 | 1/1967 | Leverdingen | 43/17.2 |
| 3,550,303 | 12/1970 | Western | 43/17.2 |
| 3,987,573 | 10/1976 | Clayton | 43/17.2 |

FOREIGN PATENT DOCUMENTS

| | | | |
|---|---|---|---|
| 532,275 | 10/1956 | Canada | 43/17.2 |

*Primary Examiner*—Louis G. Mancene
*Assistant Examiner*—Robert P. Swiatek

[57] ABSTRACT

A fishing lure retriever is comprised of a hollow non-buoyant tubular member having a continuous slot in one side for the insertion of a fishing line, an element within the tubular member to prevent the fishing line from exiting the slot after it has been inserted, and a pair of grappling hooks pivotally mounted to the bottom of the tubular member for engaging a snagged fishing lure to permit the retrieval thereof by means of a strong cord attached to the front of the tubular member.

4 Claims, 23 Drawing Figures

U.S. Patent April 25, 1978 Sheet 1 of 3 4,085,537
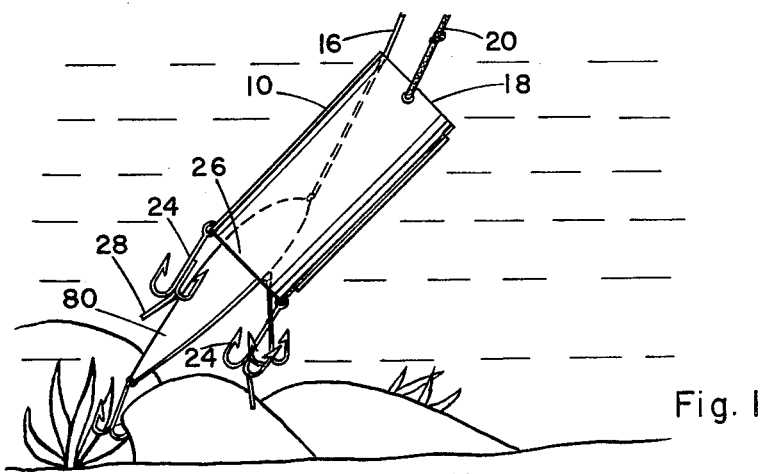
Fig. 1
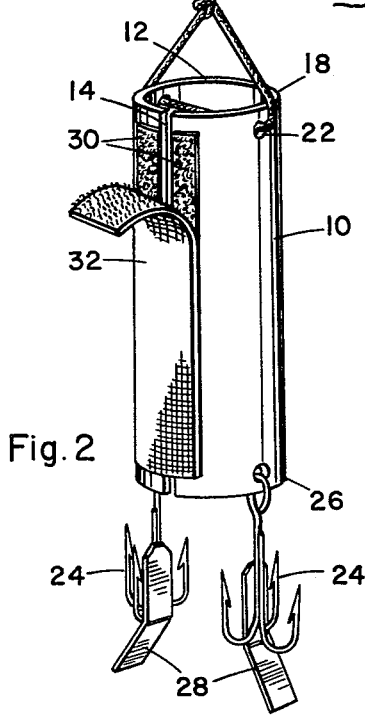
Fig. 2
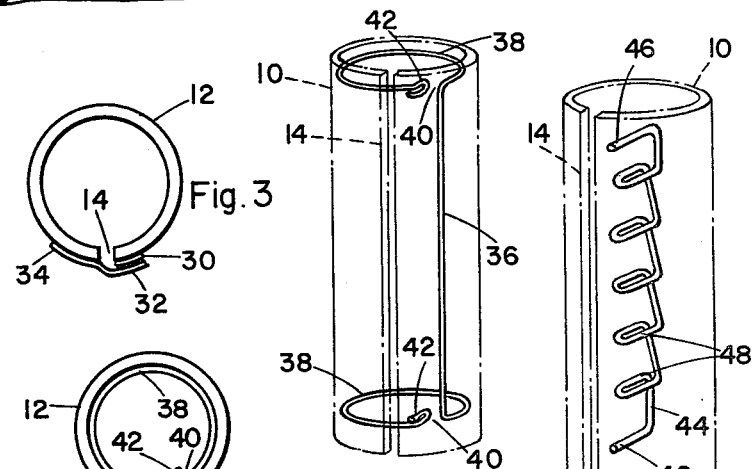
Fig. 3 Fig. 4 Fig. 6
Fig. 5
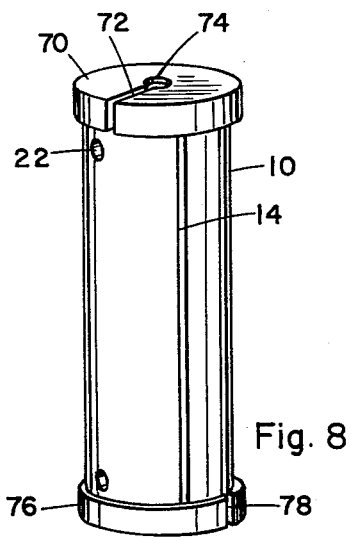
Fig. 8
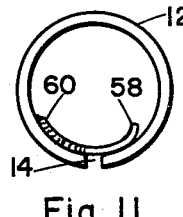
Fig. 9
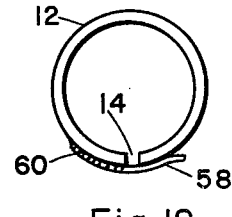
Fig. 10
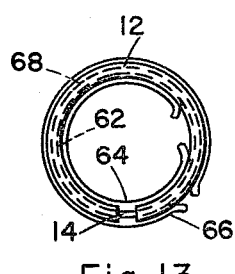
Fig. 7
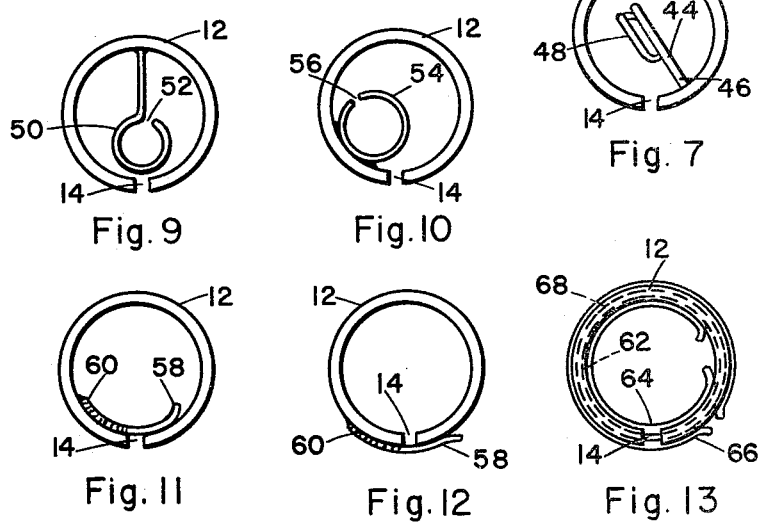
Fig. 11 Fig. 12 Fig. 13

FISHING LURE RETRIEVER

BACKGROUND OF THE INVENTION

This application is a continuation-in-part of abandoned application Ser. No. 686,584, filed May 14, 1976, and which is a continuation-in-part of abandoned application Ser. No. 643,548, filed Dec. 22, 1975, on a FISHING LURE RETRIEVER, by the instant applicant. The invention is in the field of sports fishing, and particularly relates to snagged fishing lure retrievers.

It is a common experience among sports fishermen to have a lure become snagged in weeds or rocks in the murky depths beyond visibility, and seasoned fishermen are well aware that retrieval of the lure by increased tension on the lightweight fishing line will frequently result in the loss of the lure forever when the line snaps. Often this will be the fisherman's favorite lure, and as good fishing lures are fairly expensive, lure loss adds considerably to the cost of fishing, not to mention the frustration.

Although lure retrieving devices have been designed in the past to overcome this problem, commonly, these units are slid down the fishing line and are either battered against the lure by reciprocating a cord attached to the retriever in an effort to dislodge the lure, or the retriever may be provided with a mechanism for gripping either the fishing line itself near the lure, the lure leader, or the swivel attachment to the lure, but in any event, the lure itself is not engaged by the retriever and the swivel attachment and leader are subject to snapping just as is the fishing line itself if the lure is firmly snagged.

SUMMARY OF THE INVENTION

The lure retriever of the present invention solves the above-mentioned problems and comprises a non-buoyant tube having a slot in the side thereof to which a fishing line attached to a snagged lure may be passed, there being one of several means within the tube to retain the line and prevent its escape through the slot. The top end of the tube is attached to a strong cord which is operated by a fisherman, and a pair of swivel-mounted grappling hooks are mounted to the bottom of the tube. The hooks are preferably provided with a planar deflector to deflect the hooks outwardly as the tube is lowered through the water so that when the tube encounters the lure, at least a portion of the lure enters the tube clear of the hooks, and the hooks then fall into place to engage the hooks on the lure or other parts thereof.

BRIEF DESCRIPTION OF THE DRAWINGS

FIG. 1 illustrates the lure retriever in use showing the lure partially entered into the retriever with the grappling hooks engaging the lure;

FIG. 2 is a perspective view of the retriever;

FIG. 3 is an end elevation view of a Velcro fastener attachment wherein the two strips are fastened together along one edge;

FIG. 4 is perspective view of an alternative line retainer;

FIG. 5 is an end elevational view of the structure of FIG. 4;

FIG. 6 is a perspective view of a further line retainer;

FIG. 7 is an end elevational view of the structure of FIG. 6;

FIG. 8 is a perspective view of a retriever body with line retaining end caps;

FIGS. 9 – 13 are end elevational views of alternative line retainer arrangements;

DETAILED DESCRIPTION OF THE PREFERRED EMBODIMENTS

Figure 14:
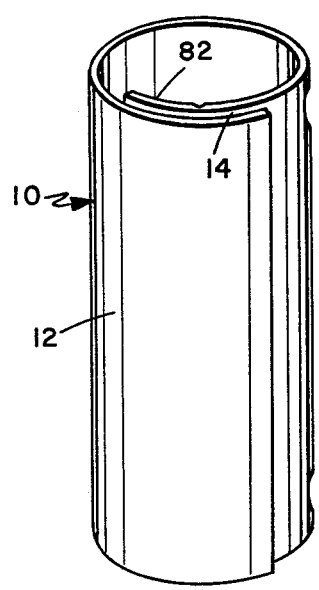
FIG. 14 is a perspective view of an alternative unit made from a single piece of sheet material.

The best overall view of the invention is illustrated in FIG. 2, which shows the hollow tubular body 10 of the lure retriver, which is defined by a wall 12 composed of steel, lead, or other non-buoyant, heavy material, and is shown as cylindrical in the drawings, although the term "tubular" as used herein is not intended to be limited to cylindrical tubes and embraces tubes of non-circular cross-section as well as cylinders. The wall 12 is not completely continuous and defines a slot 14 through which a fishing line 16 may be inserted so that the line is disposed within the tubular member as shown in FIG. 1. The front end 18 of the tubular member is connected to a strong cord 20 which is tied through the holes 22 in the cylindrical wall, there clearly being other equivalent means of attaching the cord.

A pair of grappling hooks 24 are attached to the rear end 26 of the tubular member in such a fashion that they may swivel or pivot as is clear from the drawings to engage the snagged fishing lure. These hooks may be fishing hooks as illustrated and provided in numbers other than two, and the hooks themselves may have only one or two prongs as desired. Each of the grappling hooks preferably has mounted thereto a deflector blade 28 which extends downwardly and outwardly with respect to the tubular axis so that the possibility of the hooks blocking the entry of a snagged lure into the tubular member are minimized since the ambient water flow as the retriever is lowered will separate the hooks, so that they extend laterally and possibly even forwardly with respect to the tube, permitting the lure to at least partially enter the retriever without interference. It would, of course, be possible to use the hooks without the deflector although they produce and obviously advantageous result in use.

Several modifications of the means to retain the line within the tubular member are illustrated. Referring to FIGS. 2 and 3, a first split Velcro strip 30 is adhered to the external surface of the wall 12 on opposite sides of the slot 14, and a second Velcro strip 32 is used to mate with the split strip whereby the slot is covered. The two Velcro strips may be connected together along one edge as shown in FIG. 3 at 34 so that the second strip may be opened like a page of a book and the possibility of misplacing it is eliminated.

FIGS. 4 and 5 illustrate a line retaining means comprising a wire having a connector or spanner portion 36 terminating in clip rings 38 which are open at 40 and of diameter slightly larger than the interior diameter of the tubular member so that they are biased against the interior surface of the side wall. In order to insert a line, it may be forced through the slot to displace the free ends of the clip rings and enter the rings through the openings defined therein. The free ends 42 of the clip rings are inwardly directed as best seen in FIG. 5 to facilitate removal of the fishing line from the tubular member after the lure has been freed.

FIG. 6 illustrates a side wall having a wire 44 connected at the ends 46 to the interior surface of the member by welding, solder, or any other means. The central portions of the wire are formed into convoluted or returned sections 48 so that a fishing line which is threaded into the tubular member may be coiled around several of the convolutions. FIG. 9 illustrates an eyelet 50 mounted to the side of the tubular member opposite the entry slot, the eyelet having a discontinuity at 52 for the insertion of a fishing line. There would ordinarily be two eyelets, one near each end of the tubular member. FIG. 10 illustrates an embodiment of the line retainer which is conceptually similar to that of FIG. 9 but rather than using an eyelet, a cylinder 54 which spans most of the length of the tubular member is welded or otherwise affixed to the interior surface of the tubular member, the cylinder having a slot 56 on the side thereof remote from the slot in the tubular member so that a line passed through both slots would stand little chance of becoming disengaged.

FIGS. 11 and 12 disclose yet another modification of the line retainer in which short spring wire sections 58 are welded or otherwise attached at 60 to the tubular member on one side of the slot therein and extend across the slot in flush with the side wall 12 on the side of the slot remote from the weldment. The ends of the spring wires are slightly bent away from the side wall to facilitate removal of the line, and as can be seen, these spring wires, which would be provided in pairs at opposite ends of the unit, could be either interiorly or exteriorly disposed on the side wall.

FIG. 13 illustrates the tubular member as having a groove indicated at 62 in the interior surface of the side wall and a snap ring 64, very similar to the rings 56, seats in this groove. This interior snap ring arrangement would normally be used at both ends of the retriever, or compression snap rings 66 could be removably seated in external grooves 68 to accomplish the same general purpose.

Returning now to FIG. 8, in that embodiment a cap 70 is fastened to the front end of the tubular body and has a radial slot passing from the circumference to a center hole 74. It is of course necessary that this cap be rotatably adjustable on the retriever body so that the slots 56 and 72 may be aligned to receive the fishing line, and to this end, the cap 70 may be either threaded onto the tubular member or snapped onto an annular ridge provided in the exterior surface thereof similar to the cap of a medicine bottle. In this embodiment, it is desirable that the cord 20 not pass through the tubular member as it does in the embodiment of FIG. 2, but rather be inserted through one hole 22 only and knotted on the inside.

A split ring 76 is used at the rear end of FIG. 8 to retain the line and this ring has a slot 78 and is threadedly or otherwise rotatably engaged on the tubular member as is the cap 70 so that the respective slots may be aligned to receive the line. The split ring 76, of course, does not cover the end of the tube so that the fishing lure may enter the tubular member.

Figure 15:
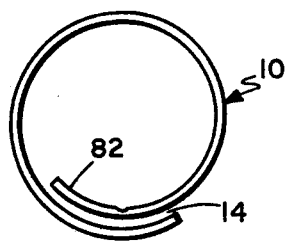
FIG. 15 is a top plan view of the structure of FIG. 14.
Figure 16:
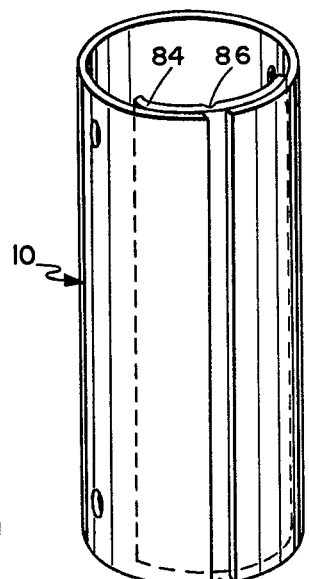
FIG. 16 is a perspective view of a further configuration.
Figure 17:
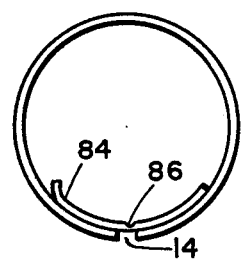
FIG. 17 is a top plan view of the structure of FIG. 16.
Figure 18:
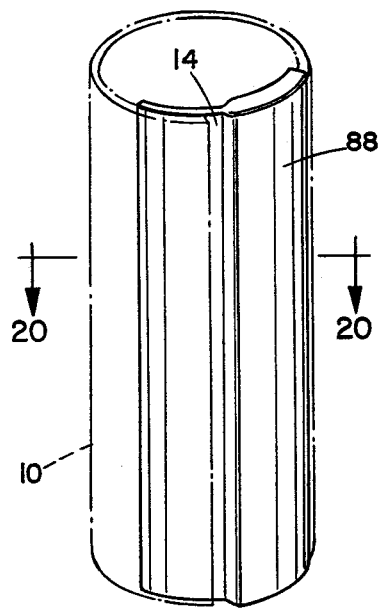
FIG. 18 is a perspective view of a unit with a clip-on retainer.
Figure 20:
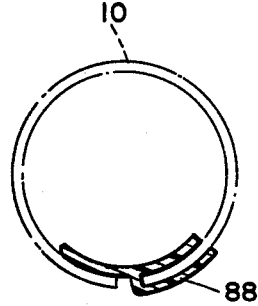
FIG. 20 is a section taken along lines 20 – 20 of FIG. 19.

FIGS. 14 through 16 disclose an embodiment in which an overlap 82 is established, in the first instance disclosed in FIGS. 14 and 15 by means of extending the side wall so that it overlaps itself as best seen in FIG. 15. In the embodiment illustrated in FIGS. 16 and 17, the effect of the overlap is established by the addition of a plate 84 which is spot welded or attached by other suitable means to the interior surface of the side wall. A groove 86 is provided on the interior surface of the plate and the overlap 82 to serve as a guide for the fishing line as the retriever travels down the line, and of course, this groove could also be formed in he embodiment of FIGS. 14 and 15. FIG. 18 shows an embodiment identical in concept to that shown in FIGS. 16 and 17 wherein a plate 84 is used as the line engaging means but is different in that rather than being spot welded, the plate is engaged with a clip 88 which is inserted over one end and around the right edge of the slot formed in the tubular member. It is contemplated that this plate be constructed in plastic and for this reason a clip is used and it will be noted that the edge of the plastic member, which extends across the slot, is flush with the interior of the tube since it is sufficiently resilient to yield to the fishing line.

Figure 19:
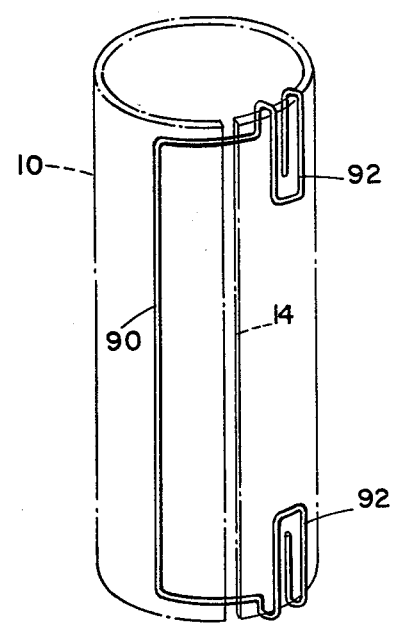
FIG. 19 is a perspective view of a unit with a wire clip retainer.

FIG. 19 illustrates an extension of the concept developed in FIG. 18 wherein rather than utilizing a planar plate as the line retaining means, a wire loop 90 is used which is similar to the embodiment illustrated in FIGS. 4 and 5, except that rather than having the clip rings 38 to maintain the loop in position, a pair of end edge engaging clips 92 enable the retainer to be snapped into place.

Although for the sake of simplicity, the hooks 24 have been omitted from many of the drawings, ordinarily they would be included. It would, of course, be obvious from the above disclosure to utilize two different embodiments of the line retaining means in the same lure retriever, and all combinations of the line retaining means disclosed are considered to be within the scope of the invention.

In the operation of the lure retriever, the line is passed through the slot in the tubular member 10 and engaged in whichever line retaining means is used. The retriever is then lowered down a fishing line 16, the grappling hooks being spread due to the presence of the deflectors, until the tubular body slips over at least a portion of a snagged lure. Upon the cessation of motion through the water, the hooks move inwardly from their outwardly deflected position to engage a hook on the lure 80 or another portion of the lure, and then, of course, the lure is retrieved by taking in the cord 20. It is an important feature of the invention that the grappling hooks directly engage the lure itself or its hooks so that the possibility of retrieval is maximum, and thus, it is similarly important tht the tubular body of the retriever be of sufficient interior diameter to permit the entry therein of most lures so that the grappling hooks may operate.

Figure 21:
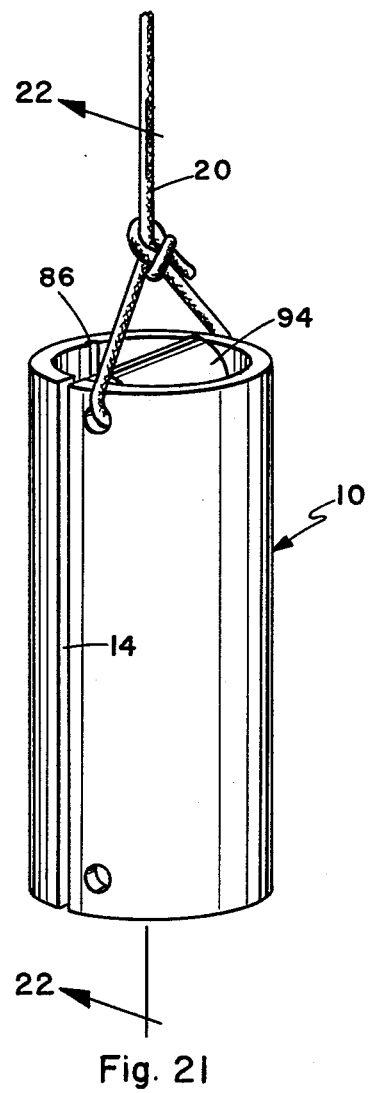
FIG. 21 is an alternative embodiment of the device utilizing a channel line retainer and an auxiliary weight.
Figure 22:
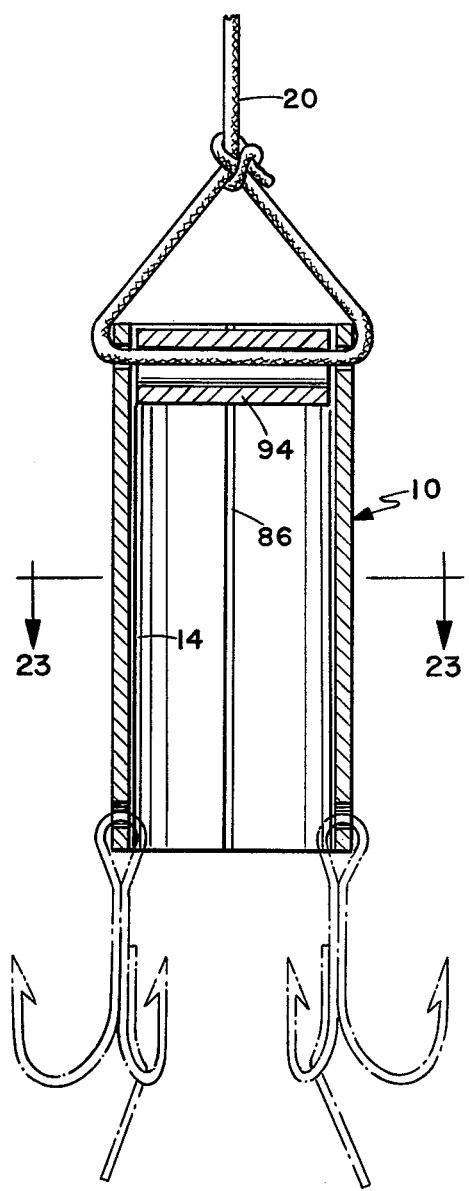
FIG. 22 is a sectional view taken along lines 22 — 22 of FIG. 21.
Figure 23:
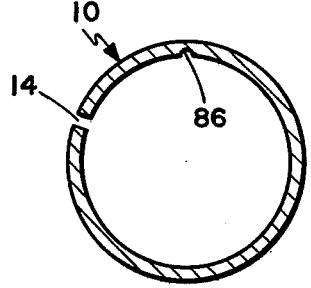
FIG. 23 is a sectional view taken along lines 23 — 23 of FIG. 22.

The last embodiment, shown in FIGS. 21 - 22 has proven the most feasible and economical from a manufacturing standpoint. The tubular body 10 is completely clear in its lower portions with no clips or interior line-retaining structure which are subject to snagging. Instead, the simple groove or channel 86 is used to slidably seat the fishing line as the retriever is lowered.

To speed the passage of the retriever down the fishing line, a cylindrical weight 94, preferably made of lead, is threaded onto the line 20 as it passes through the holes 22. This simple arrangement, with the groove and weight, has been shown to operate rapidly and effectively in the water.

The invention claimed is:

1. A fishing lure retriever comprising:
    (a) a side wall defining a non-buoyant tubular member having a front end and a rear end and a longitudinal slot extending therethrough;
    (b) means for retaining a fishing line inserted through said slot within said tubular member; and
    (c) a plurality of spaced swivel mounted hooks depending from the rear edge of said member;
    (d) each of said hooks having a deflector element attached thereto and angled rearwardly and outwardly from the axis of said tubular member to cause said hooks to expand when lowered through the water to straddle a lure on the end of a fishing line and expose an unobstructed corridor defined by said tubular member to receive a lure, said deflector elements also acting to deflect said hooks together into engagement with a lure positioned therebetween when said retriever is raised through the water.

2. A fishing lure retriever according to claim 1 wherein said side wall laterally overlaps itself over the entire length of said tubular member to define said slot as a spaced parallel-walled open passageway between the overlapping edges of said wall.

3. Structure according to claim 1 wherein said means for retaining a fishing line comprises Velcro-type material attached externally on said side wall along both sides of said longitudinal slot, and a mating strip of Velcro-type material to cover said slot and capture a fishing line within said tubular member.

4. A fishing lure retriever comprising:
    (a) a side wall defining a non-buoyant tubular member having a front end and a rear end and a longitudinal slot extending therethrough;
    (b) means for retaining a fishing line inserted through said slot within said tubular member;
    (c) at least one swivel-mounted hook depending from the rear end of said tubular member for engaging a fishing lure.
    (d) said retaining means comprising an open longitudinal channel, defined in the inner surface of said tubular member itself, in which a fishing line can slidably seat in use;
    (e) the front end of said tubular member being provided with a pair of opposed holes and including a tether line passing through said holes and tied to itself to secure said lure retriever; and
    (f) an apertured weight disposed in said tubular member between said holes and having said tether entrained therethrough.

\* \* \* \* \*